US005838286A

United States Patent [19]

Pfeiffer et al.

[11] Patent Number: 5,838,286

[45] Date of Patent: Nov. 17, 1998

[54] DISPLAY MODULE

[75] Inventors: James W. Pfeiffer, Los Gatos; Gary R. Cantu, San Jose, both of Calif.

[73] Assignee: Pricepoint, Inc., Sunnyvale, Calif.

[21] Appl. No.: 876,685

[22] Filed: Jun. 17, 1997

Related U.S. Application Data

[63] Continuation of Ser. No. 538,196, Oct. 3, 1995, which is a continuation of Ser. No. 363,969, Dec. 23, 1994, which is a continuation of Ser. No. 219,666, Mar. 29, 1994.

[51] Int. Cl.$^{6}$ .............................. G09G 3/00; G09G 3/04; G09G 5/00; G06F 7/04

[52] U.S. Cl. .............................. 345/30; 345/33; 345/117; 340/825.35

[58] Field of Search .................................... 235/383, 385; 40/446–451; 364/401; 345/30, 33, 43, 50, 52, 207

[56] References Cited

U.S. PATENT DOCUMENTS

| | | | |
|---|---|---|---|
| 3,689,910 | 9/1972 | Glaser | 345/62 |
| 4,002,886 | 1/1977 | Sundelin | 235/61.7 R |
| 4,359,633 | 11/1982 | Bianco | 235/468 |
| 4,500,880 | 2/1985 | Gomersall et al. | 340/825.35 |
| 4,567,481 | 1/1986 | Meier et al. | 345/50 |
| 4,603,495 | 8/1986 | Stevens | 40/451 |
| 4,679,823 | 7/1987 | Nagy | 281/43 |
| 4,794,234 | 12/1988 | Kinugawa | 235/1 D |
| 4,858,357 | 8/1989 | Thorn | 40/450 |
| 5,019,811 | 5/1991 | Olsson et al. | 340/825.17 |
| 5,111,196 | 5/1992 | Hunt | 235/383 |
| 5,160,920 | 11/1992 | Harris | 345/207 |
| 5,192,944 | 3/1993 | Otsuki et al. | 345/33 |
| 5,198,644 | 3/1993 | Pfeiffer et al. | 235/383 |

OTHER PUBLICATIONS

Product Brochure; 8 pages; Title; pricer ESL ( author and date unknown).

*Primary Examiner*—Jeffery Brier
*Assistant Examiner*—David L. Lewis
*Attorney, Agent, or Firm*—Robert S. Lipton, Esq.; Lipton, Weinberger & Husick

[57] ABSTRACT

A module for displaying information which is electronically controllable and information which is not so controllable. Substantially the entire front (visible) face of the module is divided into two portions. One is the face of a LCD display. The second is the face of a solar cell. The face of the solar cell is covered by a transparent overlay which bears the non-controllable information.

21 Claims, 1 Drawing Sheet

DISPLAY MODULE

This is a continuation of co-pending application Ser. No. 08/538,196 filed on Oct. 3, 1995, which is a continuation of Ser. No. 08/363,969 filed on Dec. 23, 1994 which is a continuation of abandoned Ser. No. 08/219,666 filed on Mar. 29, 1994.

BACKGROUND OF THE INVENTION

The present invention relates to information display modules, and particularly to such modules which are used to display the price, name, quantity and other related information pertaining to products for sale in supermarkets, or the like.

It is known to provide such modules in the form of wafer-like objects mounted near the products to which they apply, e.g. on the front edge of the shelves on which the products themselves are stocked.

It is also known to divide the visible face of such modules into three separate distinct portions.

One portion is occupied by the face of an electronically controlled display, usually a liquid crystal display (LCD). Its electronic controllability makes it suitable for providing information which needs changing relatively frequently, such as product prices, announcements of promotions, and the like.

A second portion is occupied by conventionally printed, or written information, typically on a paper label which is adhesively or otherwise mechanically made part of the module face. This portion is used to display information which does not need to be changed as frequently, such as the name of a product, its weight, and the like.

The third portion is the exposed face of a photovoltaic device (hereafter referred to by the commonly used term "solar cell"). This solar cell is used to provide electric power for the module, partly to operate the electronic display (LCD) and partly to operate other electronic functions, such as communication between the module and the equipment which provides the electronic control for its LCD display and the monitoring of its operation.

This technology presents conflicting requirements. On the one hand, the overall dimensions of the module, and especially its face dimensions, should be as small as possible. That keeps it from distracting attention from the products themselves and, perhaps more importantly, it keeps its cost down. On the other hand, the information which it provides should be displayed in as big symbols (letters and numerals) as possible. This makes it easier to read the information and therefore enhances its utility. The known modules described above have not well reconciled this conflict.

SUMMARY OF THE INVENTION

Accordingly, it is an object of the present invention to provide a display module which improves over the known modules previously described.

It is another object to provide a module which better utilizes its front face dimensions.

It is another object to provide a module which better reconciles the conflict between symbol size and module dimensions.

These and other objects which will appear are achieved in accordance with the present invention as follows.

Substantially the entire front (visible) face of the module is now divided into two portions. One portion is formed by the face of the LCD display. The second portion is formed by the face of the solar cell. Over at least the face of the solar cell there is placed an overlay which has light transmissivity sufficient to allow operation of the solar cell. This overlay bears that information which does not need to change frequently and which, in previously known modules, had been provided on a separate portion of the module face.

BRIEF DESCRIPTION OF THE DRAWINGS

For further details, reference is made to the discussion which follows, in light of the accompanying drawings, wherein.

DETAILED DESCRIPTION OF THE PREFERRED EMBODIMENTS

Figure 1:
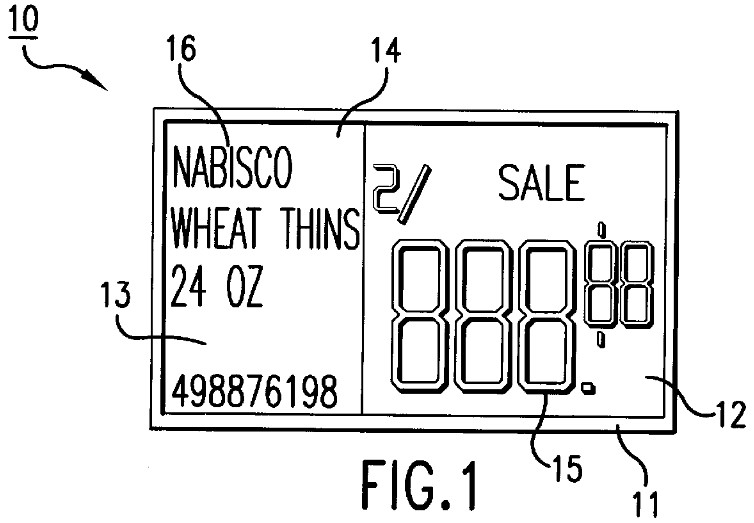
FIG. 1 is the front elevation of a module embodying the present invention.

Turning now to FIG. 1, this shows a module 10 embodying the invention. This module, which may in reality be approximately 2.5 inches long (i.e. measured from left to right in FIG. 1) and 1.36 inches high has a frame 11 similar to a narrow picture frame. Recessed in and retained by frame 11 is an LCD display whose front face is represented by the light gray portion 12 at the right in module 10. Next to LCD display 12 is a solar cell 13 whose front face is represented by the black portion at the left in module 10.

In addition, in front of solar cell 13, there is a transparent overlay 14.

Figure 2:
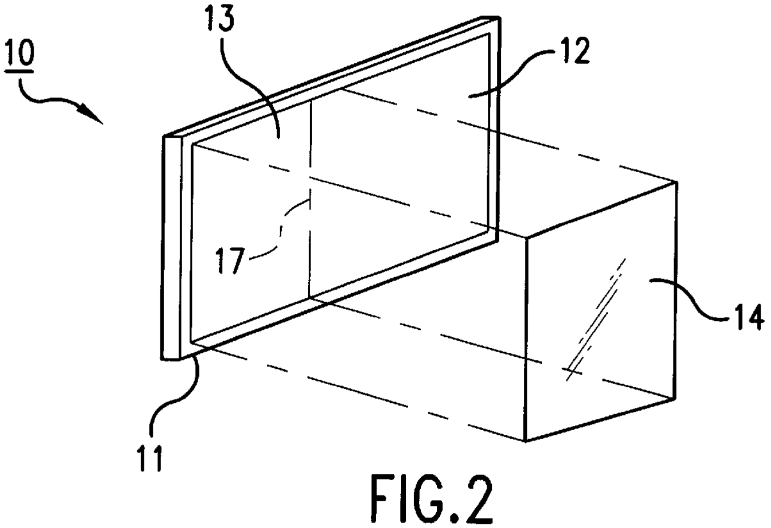
FIG. 2 is an exploded isometric view, in diagrammatic form, of the module of FIG. 1.

This spatial relationship between solar cell 13 and overlay 14 is better seen in FIG. 2, which shows the same module 10, but with overlay 14 "exploded" from its real position immediately adjacent solar cell 13.

As shown in FIG. 1, electronically controllable information (represented by symbols 15 in FIG. 1) is displayed on LCD 12. The manner in which this information may be controlled is entirely conventional and is therefore not further discussed here.

As also shown in FIG. 1, information which is not electronically controllable (represented by symbols 16 in FIG. 1) is displayed in the portion of module 10 which is occupied by the face of solar cell 13. However, these symbols 16 are not applied to the face of solar cell 13. Rather they are applied to overlay 14, and preferably to the back of the overlay, i.e. to the side facing the solar cell. This application may be made in any conventional manner (by printing, handwriting, xerography, etc.). It is preferably made before the overlay 14 is applied to the face of solar cell 13.

When the overlay 14 is then so applied, the result is module 10 which displays the product name (Nabisco Wheat Thins in this illustrative example), its weight (24 ounces) and its SKU code (498876198). This information can only be changed by physically changing overlay 14. Module 10 also displays on the LCD face that the product is on "sale" and that its price is 2 for 888.88. This latter displayed information can be changed electronically.

It should be noted that all the "information" shown in FIG. 1 as being displayed by module 10 is purely illustrative of the invention and is not intended to portray actual product information.

It should also be noted that all the displayed information referred to above, as well as the appearance of solar cell and LCD faces, have been omitted in FIG. 2. The only purpose of that figure is to show diagrammatically the spatial relationship between the overlay 14 and the remainder of module 10, which may be difficult to visualize from FIG. 1, alone. Broken line 17 in FIG. 2 represents the dividing line between the adjoining faces of LCD 12 and solar cell 13 in FIG. 1.

Figure 3:
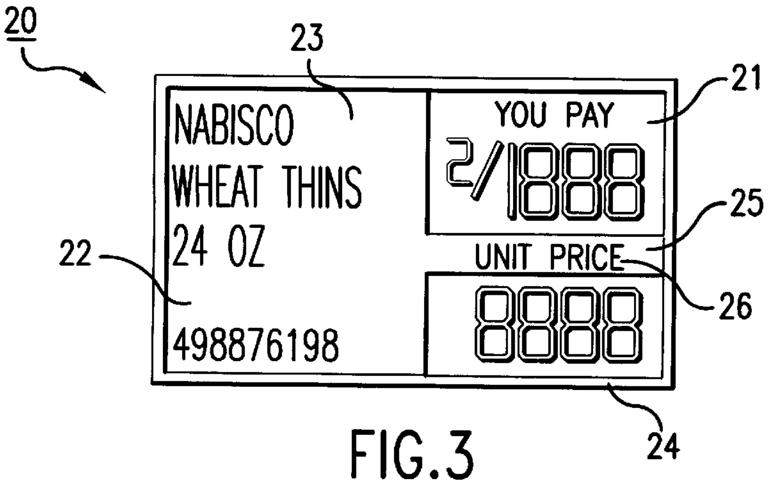
FIG. 3 is a front elevation of another embodiment.

Turning now to FIG. 3 of the drawings, this shows a different arrangement of the invention. In this instance, the module 20 has a portion 21 which is the LCD display bearing the electronically controllable information, a portion 22 which is the solar cell providing power for the module, and an overlay 23 bearing the information which is not electronically controllable.

In this embodiment, the overlay 23 extends over both portions 21 and 22, substantially filling the space within frame 24 of module 20. This enables the overlay to bear not only the information shown in front of solar cell 22, but also the dark strip 25 overlying the center of LCD portion 21 and the letters 26 forming the words "Unit Price" which appears on that strip 25.

As can be seen, this enables the LCD display 21 to show simultaneously the full price and the unit price for the same product. This is sometimes considered desirable from the merchandising standpoint and, in some jurisdictions, is actually a legal requirement.

It is believed to be apparent that the invention provides an efficient reconciliation between the conflicting requirements of easily readable information and small module dimensions.

The overlays 14 of FIG. 1 and 23 of FIG. 3 can be made of any thin material such as mylar which lets adequate light pass to the respective solar cells. The overlay is affixed to the appropriate face of the module in any known way, such as by a peelable adhesive similar to that used for "POST-IT" notes, or even simply by the tendency of thin plastic film to cling to surfaces such as the transparent plates which form the customary front faces of solar cells and LCDs.

Such an overlay can then be readily peeled off and replaced as needed with one bearing different information.

The information borne by the overlay is preferably applied in relatively thin lines, at least over the solar cell, so as to intercept as little light as possible.

The total coverage of the solar cell face by the overlay information is preferably limited to about 10 to 15 percent of that face. However, provided that this information coverage is discontinuous in form (e.g. alphanumeric), the coverage may be as high as about 50 to 60 percent. Scattering of light passing between the discontinuous information portions would then still provide adequate solar cell illumination.

Furthermore, this information is preferably provided in a shade, or hue which contrasts strongly with the underlying portion of the module. Since solar cells currently have a generally dark appearing face, this means that the information overlying that portion of the module may preferably be in white. Conversely, information overlying the generally pale gray LCD face may preferably be in black. Of course, other contrasting color or hue schemes may also be used when appropriate.

It will be apparent from the foregoing that the overlay used in accordance with the present invention need not be precisely coextensive with the solar cell face portion of the module, but can be smaller or larger, as appropriate, for the prevailing information display demands.

As for other aspects of the module construction and its interaction with the system of price display modules of which it would normally form a part, these can be entirely conventional and are therefore not further described or illustrated.

Thus, the internal connections between solar cell and LCD may be entirely conventional, the module may also be provided with standby buffering power in a conventional manner, the solar cell output may be used in part to maintain the charged state of this battery power, the module may be connected by wire, RF, IR, or otherwise to centralized control units for the electronically controlled display, etc.

Accordingly, it is desired that the scope of the invention be defined only by the appended claims.

What is claimed is:

1. A module for displaying information, some of which is electronically changeable and some of which is not, said module comprising:

electronically controllable means having a face on which said electronically changeable information can be viewed;

photovoltaic means having a face for receiving external illumination and positioned so that it can be viewed simultaneously with said face of said electronically controllable means; and an external overlay made of a substantially transparent material positioned over at least a portion of said face of said photovoltaic means, said overlay being adapted to have applied to it information which is not electronically changeable and said overlay being readily removable from said face of said photovoltaic means.

2. The module of claim 1, wherein said overlay is substantially coextensive with said face of the photovoltaic means.

3. The module of claim 1, wherein said overlay extends beyond the face of the photovoltaic means and over at least a portion of the face of the electronically controllable means, said overlay being also readily removable from said face of said electronically controllable means.

4. The module of claim 3 wherein the overlay which extends over the face of the electronically controllable means also has information applied to it.

5. The module of claim 3, wherein said overlay is made of a thin plastic film.

6. The module of claim 5, wherein said overlay is affixed to said photovoltaic means and said electronically controllable means by a peelable adhesive.

7. The module of claim 5, wherein said face of said electronically controllable means is a transparent plate, and said face of said photovoltaic means is a transparent plate.

8. The module of claim 7, wherein said overlay is affixed to said face of said photovoltaic means and to said face of said electronically controllable means, and stays affixed thereto due to the tendency of thin plastic films to cling to plate surfaces.

9. The module of claim 1, wherein said faces of the electronically controllable means and of the photovoltaic means are positioned adjacent to each other and together occupy substantially the whole display area of the module.

10. The module of claim 1 wherein the electronically controllable means is a liquid crystal display and the photovoltaic means is a solar cell.

11. The module of claim 1, wherein said overlay is made of a thin plastic film.

12. The module of claim 11, wherein information applied to said overlay does not substantially reduce said received illumination.

13. The module of claim 12 wherein the applied information is alpha numeric.

14. The module of claim 12 wherein the applied information covers not more than about 50 to 60 percent of the face of the photovoltaic means, and preferably not more than about 10 to 15 percent.

15. The module of claim 12 wherein the applied information covers discontinuous portions of the face of the photovoltaic means, so as to enable the external illumination to reach said face of the photovoltaic means through the spaces between said portions.

16. The module of claim 11, wherein the information applied to said overlay is of a hue which contrasts substantially with that of the face of the photovoltaic means.

17. The module of claim 16, wherein the face of the photovoltaic means is of a dark hue and the applied information is of a light hue.

18. The module of claim 11, wherein the information is applied to said overlay on the side adjacent to the photovoltaic means.

19. The module of claim 11, wherein said face of said photovoltaic means is a transparent plate.

20. The module of claim 19, wherein said overlay is affixed to said face of said photovoltaic means, and stays affixed thereto due to the tendency of thin plastic film to cling to plate surfaces.

21. The module of claim 11, wherein said overlay is affixed to said face of said photovoltaic means by a peelable adhesive.

* * * * *